United States Patent

[11] 3,624,778

[72] Inventor Josef Weber
        Beloit, Wis.
[21] Appl. No. 40,507
[22] Filed May 26, 1970
[45] Patented Nov. 30, 1971
[73] Assignee Beloit Corporation
        Beloit, Wis.

[54] FILTER PRESS
    7 Claims, 4 Drawing Figs.
[52] U.S. Cl. .................................................. 210/230,
                                                        100/199
[51] Int. Cl. ................................................... B01d 25/00
[50] Field of Search ........................................ 210/224,
        225, 226, 227, 228, 229, 230, 231; 100/198, 199,
                                                        278

[56] References Cited
    UNITED STATES PATENTS
2,949,845  8/1960  Kurlfa ......................... 100/198

Primary Examiner—Reuben Friedman
Assistant Examiner—T. A. Granger
Attorney—Larson, Taylor and Hinds ABSTRACT: A filter press with a multiplicity of filter plates movable on guides and interconnecting means for said filter plates having as the interconnecting means an elongated, flexible cable means, the points of attachment of which are at the top of the interconnected plates.

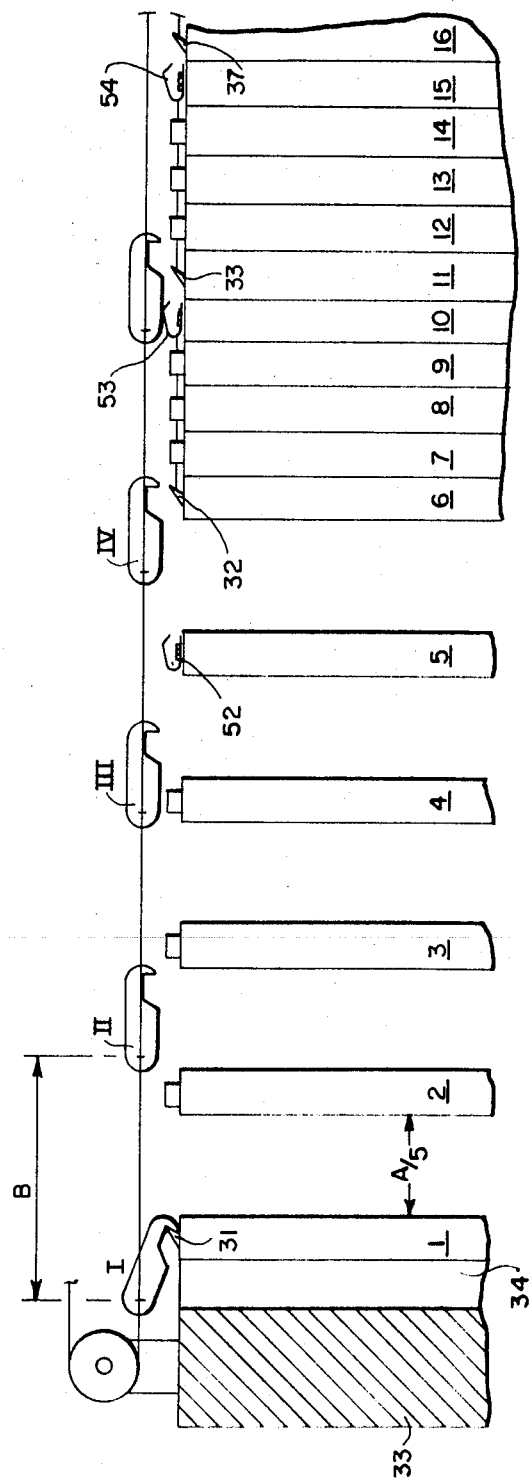

FILTER PRESS

This invention relates to an improvement in filter presses having a plurality of suspended filter plates interconnected in a manner that permits the shifting of one plate from the other to facilitate discharge of the residue accumulated during the filtration process.

Although filter presses of various design are known, they are usually composed of filter plates aligned in parallel and pressed together by suitable pressure-applying means after filter clothes are inserted in the plates. To facilitate the discharge of residue which has accumulated in the filter press during filtration, it is common to provide the press with guide means on which the plates may be shifted and to interconnect the filter plates with chains attached along each side of the series of plates. The chain length between interconnected plates is sufficient to permit separation of the plates in an accordion-like fashion when the pressure-applying means is withdrawn.

This chain-towing feature employed in the filter plate shifting operations is not without criticism, however. For example, it is not uncommon to find the interconnecting chains dropping between the sealing faces of the filter plates, particularly round filter plates during the shifting operation. Another problem often encountered with shifting devices of this kind is the tendency of the plates to tip when being shifted.

It is an object of the invention to provide an improved shifting device for filter presses composed of a multiplicity of filter plates interconnected and movable on guide means.

Another object of the invention is to provide a shifting device characterized by interconnecting means which do not drop between the sealing faces of the filter plates during shifting operations.

Yet another object of the invention is to provide a shifting device which prevents the filter plates from tipping during shifting operations.

These and other objects of the invention are obtained by interconnecting the multiple filter plates with elongated, flexible cable means, the points of attachment of said interconnecting cable means being at the top of each interconnected filter plate. Attachment of the cable means to the top of the filter plates is made in a manner enabling deflection and retention of the interconnecting cable means in a horizontal plane when the filter plates are shifted into closed position. Any suitable fastening means may be used for effecting the attachment. The length of the cable means interconnecting any two filter plates is sufficient to enable shifting of the filter plates one from the other either manually or by mechanized means to facilitate discharge of accumulated residue and cleaning of the plates. Any elongated cable means or its equivalent can be used so long as it possesses a flexibility that permits deflection and retention of the cable means in a horizontal plane when the plates are shifted together into the closed position. By this construction, the ability of the present invention to effectively preclude dropping of the interconnecting means between the sealing faces of the filter plates when they are closed is readily seen.

Particularly preferred cable means are steel cables meeting the aforementioned requirements, although other materials of suitable flexure and strength may be used as well. Also, to insure flexing and retention of the cable means in a horizontal plane, the cable means should be attached a small axial distance inside the top edge of each of the interconnected plates to be supported thereon. Alternatively each end of the cable means may be rotatably mounted at the top of the interconnected plates by suitable means as, for example, through use of eyebolts attached to a clevis as shown in the attached drawings.

In a preferred embodiment, the attachment of the cable means to each filter plate is made along substantially the top center line of the series or package of filter plates interconnected. In this way, the resultant pulling force for opening of the plates is in a direct line with the points of attachment of the cable means. Consequently, tipping of the filter plates is prevented and only a single interconnecting means between plates is necessary.

The invention will now be described by reference to the accompanying drawings where:

FIG. 4 is a side view of the filter press with the first package of filter plates opened by a preferred shifting mechanism.

Figure 1:
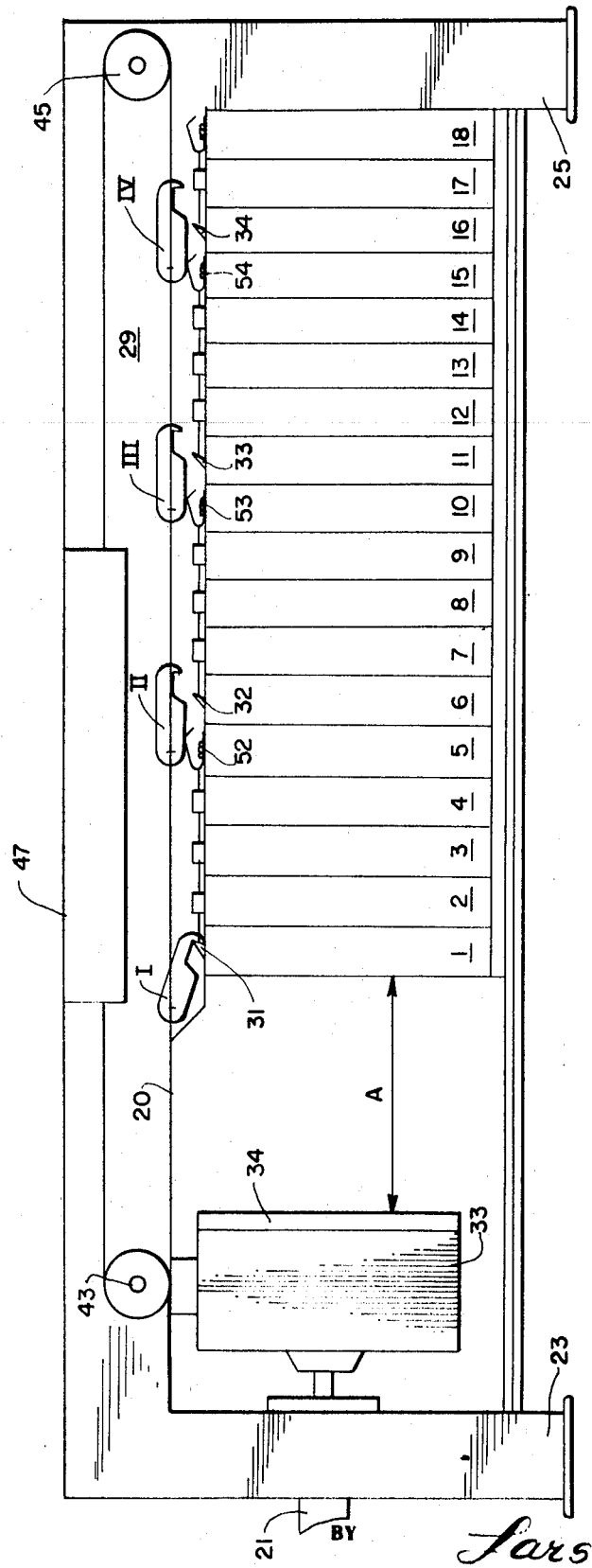
FIG. 1 represents a general arrangement in side view of a pressure filter of the invention.

Referring to the drawings, the pressure filter of FIG. 1 consists principally of two supports 23 and 25. Between the supports filter plates 1–18, usually of rectangular or round construction and lying in parallel position to each other, are suspended vertically from an overhead beam 29. Each plate has a trolley (not shown) attached to it which facilitates effortless shifting of the plates. A mechanically driven pressure element such as a hydraulic cylinder 21 being connected to a follower 33 containing a liner plate 34 is positioned in support 23 and adapted to move a distance A for compressing the filter plates. Dimension A corresponds to the maximum stroke of the rod of the hydraulic cylinder or the maximum travel of the follower 33 and usually determines the total discharging or cleaning space available.

Figure 2:
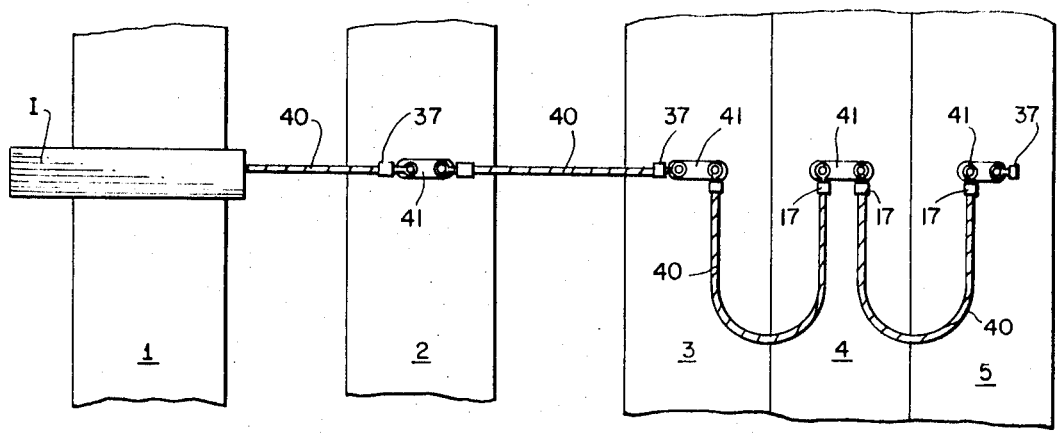
FIG. 2 is a fragmentary top view in larger scale of one series of the plates of the pressure filter of Fig. 1 in partially open position.
Figure 3:
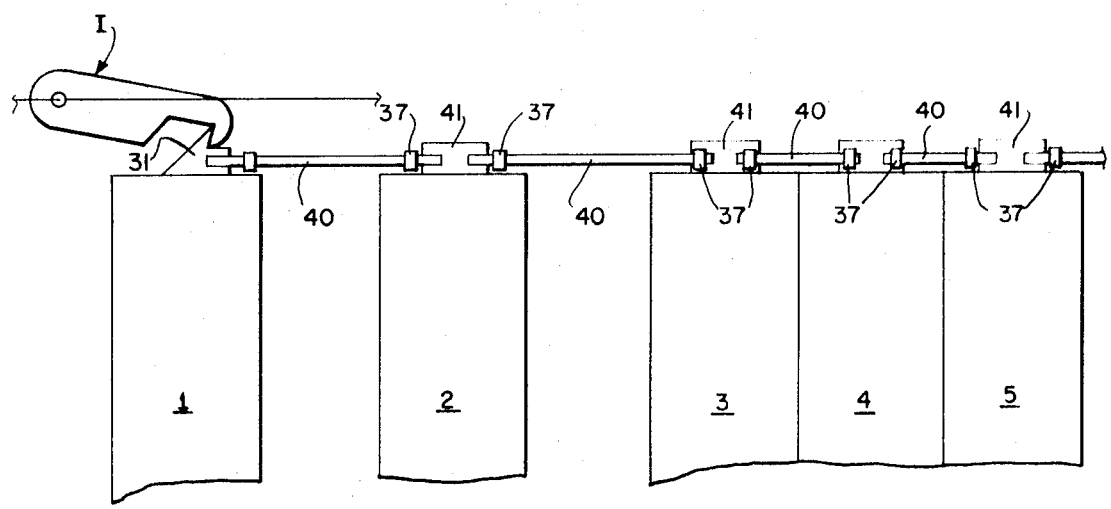
FIG. 3 is a side view of the portion of the pressure filter represented by FIG. 2.

Referring particularly to Figs. 2 and 3, a package of filter plates 1–5 is interconnected by means of steel cables 40 provided at each end with eyebolts 37 which are attached to clevises 41 provided the filter plates except for filter plate 1 where the attachment is made to cam 31. Since the eyebolts 37 are free to rotate on the pins of the clevises and on the portion of cam 31, to which they are attached, deflection of each cable means in a horizontal plane is promoted.

As shown, the individual cables are used to effect the various interconnections, however, a single continuous cable may also be used provided appropriate means, a variety of which are evident to those skilled in the art, for fastening the cables to the tops of the plates. Advantageously, the fastening or attaching means for the cable means are located on the filter plates along substantially the top center line of the series of interconnected plates. Such an arrangement, as aforementioned, prevents tipping of the plates since the pulling force applied to open the series of plates is in a direct line with the points of attachment.

For discharge of the filtration residue which forms on the individual plates, the follower 33 is moved back so that plates may be moved toward the left, one after the other, so that the filtration surfaces containing the filtration residue are made accessible. Since the total discharge or cleaning space available is the distance A corresponding to the stroke of follower 33, the space between equally spaced filter plates is approximately $A/X$ where $X$ is the number of plates in the interconnected package. Accordingly, in the case of equispaced plates the length of the cable means between interconnected plates will be at least $A/X$.

Shifting of the plates may be accomplished by a variety of ways, one of which is shown in the accompanying drawings. In the embodiment shown, in FIGS. 1–4, a plate shifting arrangement is built into the overhead beam as shown in FIG. 1. The plate shifting arrangement comprises a reciprocating chain or cable 20 wound around sprockets 43 and 45 and driven by a pneumatic, hydraulic, or motor-driven reciprocating mechanism diagrammatically illustrated as 47. Along the lower part of the reciprocating chain a number of latching elements such as hooks I, II, III and IV are placed a distance B apart which corresponds to the number of plates being moved times the plate thickness plus sufficient clearance to allow the hook to drop in behind the cam as shown by FIG. 4. Note that in FIG. 4, (5) plates are being moved, thus, distance B equals 5 plate widths. Plates 1, 6, 11 and 16, each of which represents the first plate of each package or series of interconnected plates, is provided with a latch engaging means such as cams 31, 32, 33 and 34, respectively. To discharge accumulated cake the follower 33 is withdrawn to its extreme left position by means of the hydraulic cylinder, opening the filter to the dimension A as shown by FIG. 1. The reciprocating means now moves to the extreme right position enabling hook I to drop by gravity into engagement with cam 31 on plate 1, as shown by FIG. 1. Reciprocation of chain or cable 20 toward the extreme left over distance A moves plates 1, 2, 3, 4 and 5 from closed position into open position as shown by FIG. 4, the clearance distance between the plates being, therefore, $A/5$. Hooks II, III and IV are prevented from engaging cams 32, 33 and 34 during this opening operation by hook retainers 52, 53 and 54 (which, in this case, are comprised of a flat spring) attached to filter plates 5, 10 and 15, respectively. The reciprocating means 20 then returns to the right to a position where hook II engages cam 32. On movement, thereafter, of reciprocating means 20 to the left, plate 6 is moved toward plate 5 beginning the opening of the next series of plates 6, 7, 8, 9 and 10. In this opening sequence, the hook II is not disengaged when it reaches hook retainer 52 of plate 5 because the retainer, being a spring-loaded device, is such that it will not be able to push hook II from its engaged position. Continued movement of chain 20 to the left causes plate 6 to push plates 5, 4, 3 and 2 to the left as a solid block. Thereafter, the operation will repeat itself until all the plates have been shifted.

It is claimed:

1. In a filter press with a multiplicity of filter plates movable on guides, and interconnecting means for said filter plates, the improvement wherein said interconnecting means comprise an elongated flexible cable means, the points of attachment of which are at the top of said interconnected plates.

2. The filter press of claim 1 wherein said cable means is a steel cable.

3. The filter press of claim 1 wherein the points of attachment are along substantially the top center line of said interconnected filter plates.

4. The filter press of claim 1 wherein the cable means is rotatably mounted at the points of attachment.

5. In a filter press with a multiplicity of filter plates movable on guides, and interconnecting means for said filter plates, the improvement wherein said interconnecting means comprises elongated, flexible cable means rotatably attached at the top of said interconnected plates and along substantially the center line of said interconnected plates.

6. The filter press of claim 1 provided with mechanical means for moving said filter plates.

7. The filter press of claim 6 wherein the mechanical means is characterized by a movable latch element mounted on a reciprocating chain and a latch engaging element mounted on top of the first of a series of the multiple filter plates to be moved.

* * * * *